United States Patent [19]
Gellert

[11] Patent Number: 5,614,233
[45] Date of Patent: Mar. 25, 1997

[54] INJECTION MOLDING NOZZLE WITH PRESSED IN HEATING ELEMENT AND INTEGRAL COLLAR PORTION

[76] Inventor: Jobst U. Gellert, 7A Prince Street, Georgetown, Ontario, Canada, L7G 2X1

[21] Appl. No.: 502,922

[22] Filed: Jul. 17, 1995

[30] Foreign Application Priority Data

Jun. 26, 1995 [CA] Canada ................................ 2152664

[51] Int. Cl.⁶ .................................................. B29C 45/20
[52] U.S. Cl. ................................. 425/549; 264/328.15
[58] Field of Search ..................... 425/549; 264/328.15

[56] References Cited

U.S. PATENT DOCUMENTS 4,557,685  12/1985  Gellert .
4,768,283   9/1988  Gellert .
5,052,100  10/1991  Trakas ...................................... 425/549
5,225,662   7/1993  Schmidt ................................... 425/549

FOREIGN PATENT DOCUMENTS 0425981  10/1990  European Pat. Off. .

*Primary Examiner*—Tim Heitbrink
*Attorney, Agent, or Firm*—Dalesman & Company

[57] ABSTRACT

An injection molding nozzle with an outer collar portion extending around the rear end of an inner core portion. The nozzle has an electrical heating element with a helical portion extending in a spiral groove in the outer surface of the inner core portion. An integral one-piece construction is provided without having to overheat the heating element by the combination of the helical portion of the heating element being press fitted and reshaped into the groove and the outer collar portion and the inner core portion being secured together by a thermosetting ceramic sealant.

5 Claims, 3 Drawing Sheets

INJECTION MOLDING NOZZLE WITH PRESSED IN HEATING ELEMENT AND INTEGRAL COLLAR PORTION

BACKGROUND OF THE INVENTION

This invention relates generally to injection molding and more particularly to an injection molding nozzle having an elongated inner core portion, an outer collar portion, and an electrical heating element which are all integrally secured together without being subjected to high brazing temperatures.

It is well known to make an integral heated injection molding nozzle having an outer collar portion which supports the nozzle in the surrounding cooled mold. It is also known to provide an electrical heating element with a helical portion integrally secured in an elongated inner core portion. In one example, as seen in the applicant's U.S. Pat. No. 4,557,685 which issued Dec. 10, 1985, the electrical heating element is first brazed with a suitable nickel alloy in the spiral groove and then the outer collar portion is brazed in place with a suitable copper alloy. In another example, the brazing is all with a nickel alloy in a single step as shown in the applicant's U.S. Pat. No. 4,768,283 which issued Sep. 6, 1988. All of these previous nozzles are brazed which has the disadvantage that heating them to a brazing temperature of approximately 1100° F. can damage the heating element by making the resistance wire in it brittle. Thus, damage can more easily occur during shipping or installation, and the nozzle can have a shortened life span.

While EP 0 425 981 to Reinl does show press fitting an electrical heating element in a groove in the flat surface of a melt distribution manifold, this alone cannot overcome the problem of damage to the heating element in a nozzle having an integral outer collar portion.

SUMMARY OF THE INVENTION

Accordingly, it is an object of the present invention to at least partially overcome the disadvantages of the prior art by providing an integral injection molding nozzle having the combination of an electrical heating element with a helical portion which is press fitted and reshaped into place in a groove and an outer collar portion which is secured in place with thermosetting ceramic sealant.

To this end, in one of its aspects, the invention provides an injection molding nozzle having an elongated inner core portion with a rear end, a front end, a melt bore extending therethrough from the rear end, an outer surface, and a head at the rear end which extends outwardly past the outer surface, an outer collar portion encircling the inner core portion adjacent the rear end, the outer collar portion having a shoulder against which the head of the inner core portion abuts, and an electrical heating element with a lead portion extending outwardly through the outer collar portion and a helical portion with an outer surface wound in a spiral groove in the outer surface of the inner core portion, the groove having an inner surface with a semicircular base, the improvement comprising the combination of the helical portion of the heating element being sufficiently deformed by being press fitted into the groove to ensure substantially continuous contact between the inner surface of the groove and the outer surface of the helical portion of the heating element, and the outer collar portion being secured in place around the inner core portion by thermosetting ceramic sealant applied between the inner core portion and the surrounding outer collar portion.

Further objects and advantages of the invention will appear from the following description taken together with the accompanying drawings.

DETAILED DESCRIPTION OF THE INVENTION

Figure 1:
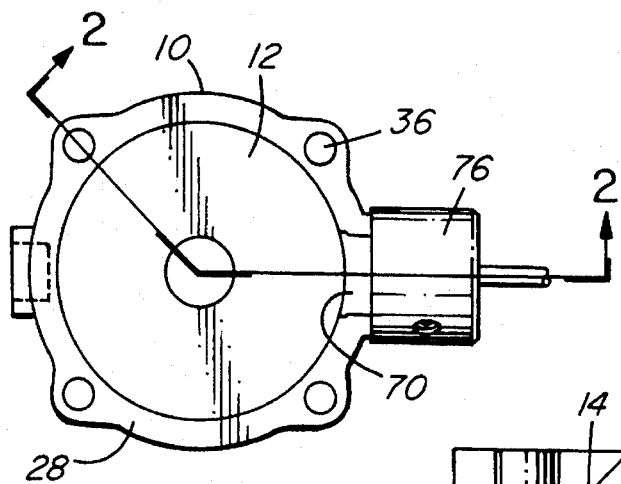
FIG. 1 is a plan view of an injection molding nozzle according to a preferred embodiment of the invention.
Figure 3:
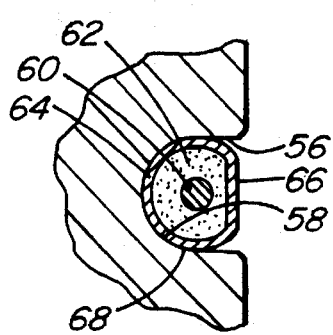
FIG. 3 is an enlarged sectional view showing the heating element press fitted into the groove.

Reference is first made to FIGS. 1 and 3 which show an integral heated injection molding nozzle 10 to be seated in a mold (not shown) according to a preferred embodiment of the invention. The nozzle 10 has an elongated inner core portion 12 with a rear end 14 and a front end 16. A melt bore 18 extends through the inner core portion 12 to convey pressurized melt from the rear end 14 to the front end 16. In this embodiment, a nozzle seal 20 having a hollow inner piece 22 and a threaded outer piece 24 is screwed into a threaded seat 26 in the front end 16 of the nozzle 10 to convey the melt to a sprue gate (not shown) in the mold. However, in other embodiments, the front end 16 of the nozzle 10 can have various other configurations to provide different types of gating.

The nozzle 10 also has an outer collar portion 28 which encircles the inner core portion 12 adjacent its rear end 14. While the outer collar portion 28 is normally made of H13 hot work tool steel, the inner core portion 12 may be made of a different material such as aluminum, stainless steel or a beryllium copper or beryllium nickel alloy having different thermal conductivities to provide the proper thermal balance for different materials or different types of gating such as thermal gating. The inner core portion 12 of the nozzle 10 has an outwardly extending head 30 at its rear end 14. The head 30 fits tightly in a seat 32 in the outer collar portion 28 and abuts against an inwardly extending shoulder 34. In this embodiment, the outer collar portion 28 has threaded holes 36 to receive screws 38 to secure it to a melt distribution manifold 40. The outer collar portion 28 has a cylindrical skirt 42 which extends forwardly around the inner core portion 12 to locate the nozzle 10 in the mold (not shown). As can be seen, a space 44 is provided between the cylindrical outer surface 46 of the inner core portion 12 and the surrounding skirt 42 of the outer collar portion 28.

Figure 4:
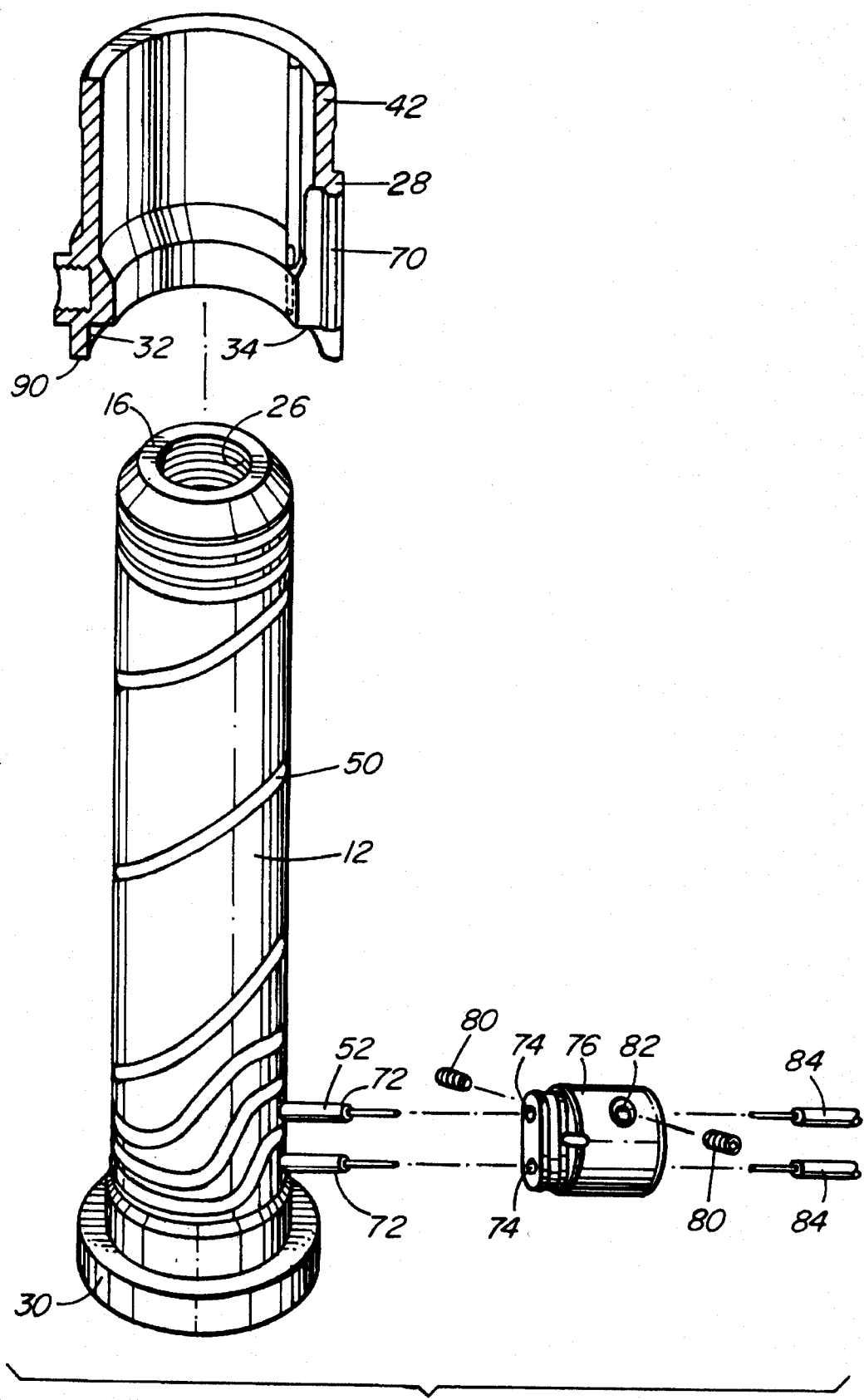
FIG. 4 is an exploded isometric view showing the heating element wound in place and the outer collar portion and the terminal plug in position for assembly.

The inner core portion 12 of the nozzle 10 has an electrical heating element 48. The electrical heating element 48 has a helical portion 50 and a lead portion 52. The helical portion 50 extends in a spiral groove 54 in the cylindrical outer surface 46 of the inner core portion 12. The pitch of the spiral groove 54 is tighter towards the rear and front ends 14, 16 where more heat is required due to greater heat loss. As best seen in FIG. 3, the spiral groove 54 has an inner surface 56 with a semicircular base 58. The electrical heating element 48 has a resistance wire 60 enclosed in a refractory powder electrical insulating material 62 such as magnesium oxide powder in an outer steel casing 64. Initially the heating element 48 has a circular cross-section with a diameter slightly less than the width of the spiral groove 54. As seen in FIG. 3, the helical portion 50 of the heating element 48 is press fitted into the groove 54 which deforms it to form a flat outer side 66 and forces its outer surface 68 out into continuous contact with the inner surface 56 of the spiral groove 54. This contact secures the helical portion 50 of the heating element 48 in place in the spiral groove 54 and ensures good heat transfer from the heating element 48 to the adjacent inner portion 12 of the nozzle 10. The lead portion 52 of the heating element 48 extends radially outward through a U-shaped opening 70 in the outer collar portion 28. As seen in FIG. 4, in this embodiment, the lead portion 52 has two separate leads 72 which extend parallel to each other, but in other embodiments can be only a single lead. The two leads 72 extend outwardly into parallel holes 74 in a ceramic terminal connector 76. The terminal connector 76 has an oblong shaped inner end 78 which fits in the U-shaped opening 70 in the outer collar portion 28. It also has two setscrews 80 which screw into two threaded holes 82 to secure the leads 72 to two overlapping lead wires 84 from a conventional power source (not shown).

The outer collar portion 28 is integrally secured in place around the inner core portion 12 by a thermosetting ceramic sealant 86 which is applied in the space 44 between the skirt 42 of the outer collar portion 28 and the outer surface 46 of the inner core portion 12. The ceramic sealant also secures the terminal connector 74 in place and seals the rest of the U-shaped opening 70 in the outer collar portion 28 against possible melt leakage. In addition to sealing against melt leakage between the inner core portion 12 and the outer collar portion 28, the band of ceramic sealant in the space 44 also provides insulation to enhance thermal separation between the inner core portion 12 and the surrounding skirt 42.

Figure 5:
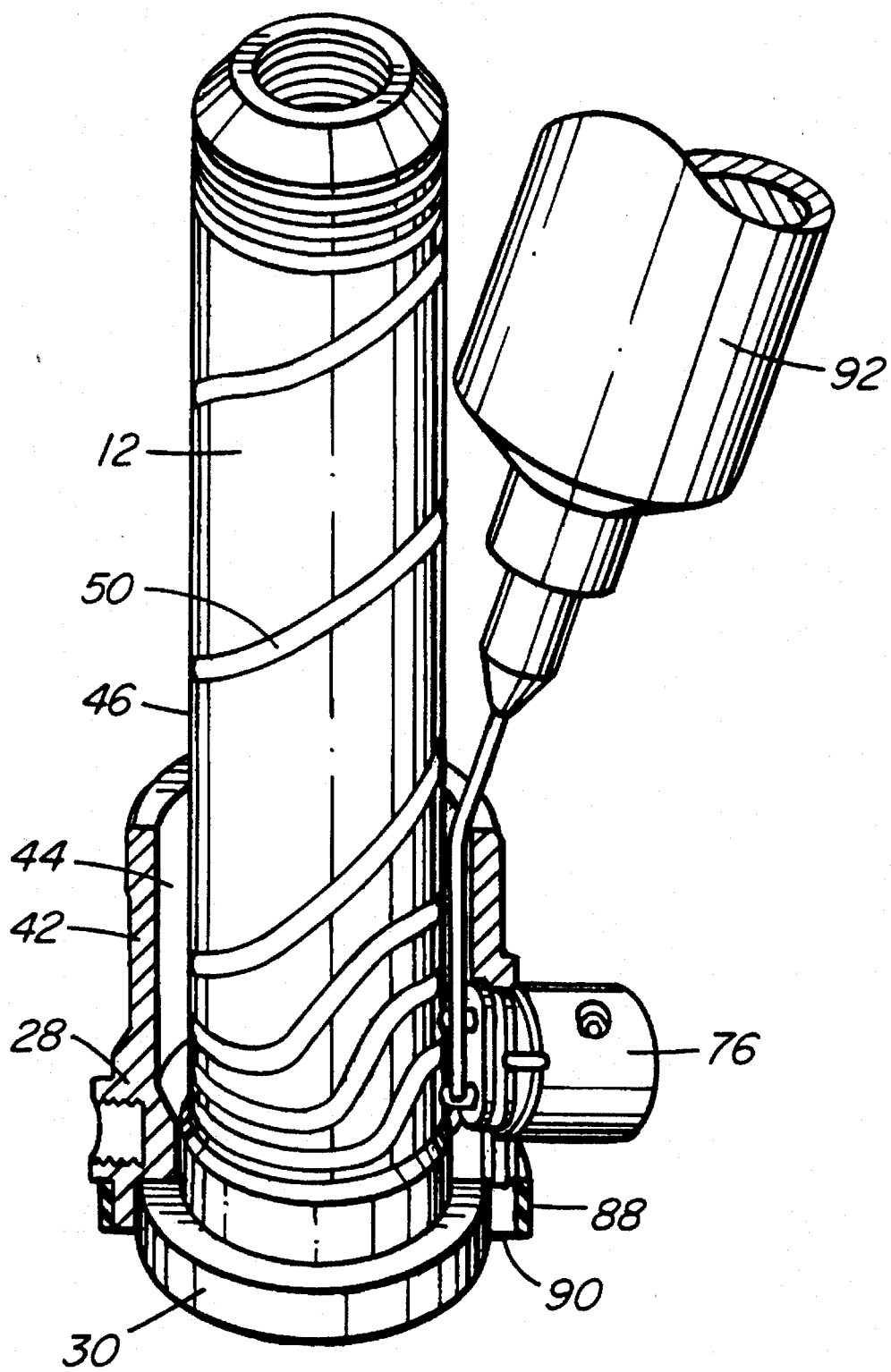
FIG. 5 is an isometric view showing application of the thermosetting ceramic sealant.

Reference is now made to FIGS. 4 and 5 in describing the method of making the injection molding nozzle 10 according to the preferred embodiment of the invention. The elongated inner core portion 12 is made with the spiral groove 54 machined in its outer surface 46 in a pattern determined by the thermal requirements of the nozzle 10. The helical portion 50 of the electrical heating element 48 is then wound in the spiral groove 54 with the lead portion 52 extending radially outward near the rear end 14. The helical portion 50 of the electrical heating element 48 is press fitted into the spiral groove 54 with a rolling tool which deforms it and provides continuous contact between the outer surface 68 of the heating element 48 and the inner surface 56 of the spiral groove 54. The hollow outer collar portion 28 slides over the front end 16 of the inner core portion 12 into place with the head 30 of the inner core portion 12 received in the seat 32 in the outer collar portion 28 and the lead portion 52 of the heating element 48 extending outwardly through the U-shaped opening 70 in the outer collar portion 28. The fit of the head 30 in the seat 32 is quite tight to accurately locate the inner core portion 12 in the outer collar portion 28.

Figure 2:
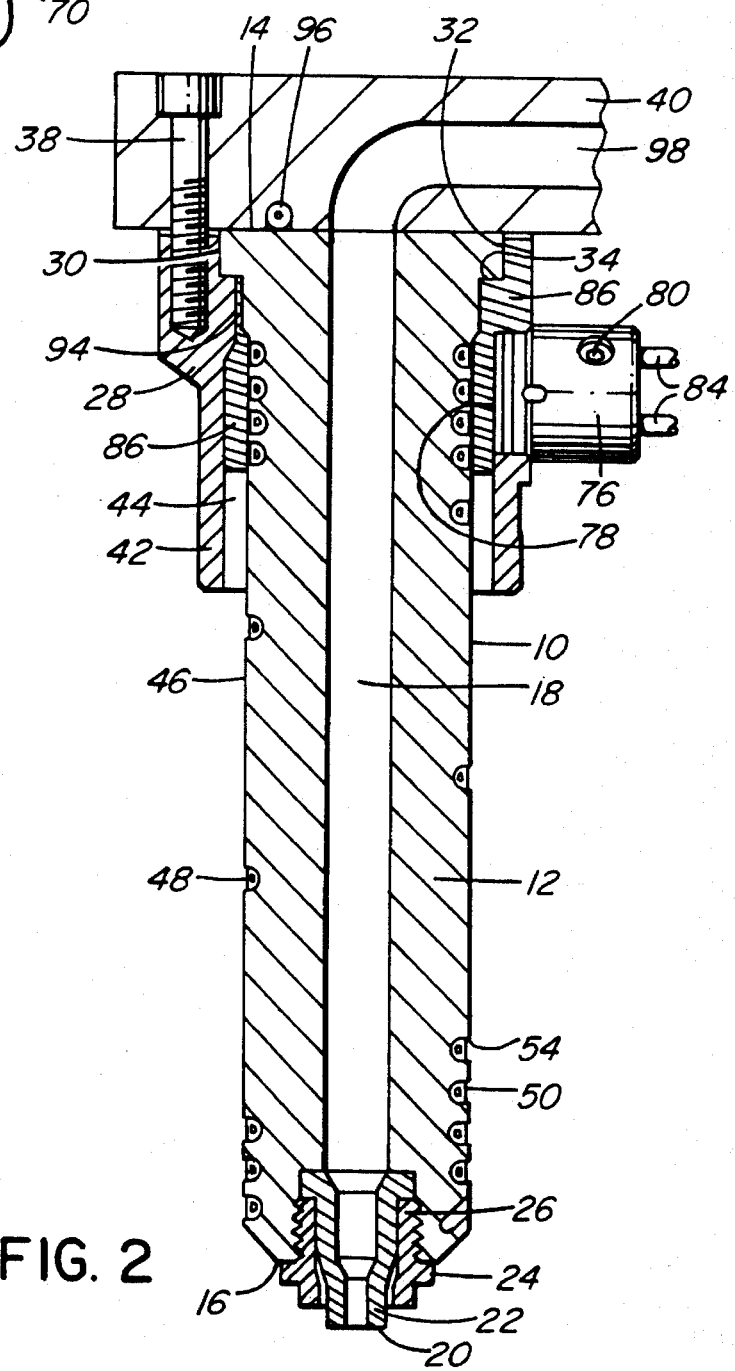
FIG. 2 is a sectional view along line 2—2 in FIG. 1.

The ceramic terminal connector 76 is then mounted in place with its oblong inner end 78 seated in the matching U-shaped opening 70 in the outer collar portion 28 and the two leads 72 extending into the parallel holes 74. An elastic band 88 is then placed around the rear end 90 of the outer collar portion 28 to cover the remainder of the U-shaped opening 70. In the upright position seen in FIG. 5, a predetermined quantity of a suitable liquid thermosetting ceramic sealant 86 such as CERAMABOND 668 (trade name of Aremeo) is applied from a pneumatic dispensing tube 92 or syringe into the space 44 between the skirt 42 and the cylindrical outer surface 46 of the inner core portion 12. The liquid thermosetting ceramic sealant 86 runs down around the inner end 78 of the connector 76 and the elastic band 88 prevents it leaking out through the opening 70 in the outer collar portion 28. As best seen in FIG. 2 the liquid thermosetting ceramic sealant 86 also runs into a small gap 94 provided around the inner core portion 12 and then fills part of the cylindrical space 44. The assembled nozzle 10 is then heated in an oven to a temperature of approximately 200° C. which solidifies the thermosetting ceramic sealant 86. This integrally secures the inner core portion 12, the outer collar portion 28, and the ceramic connector 76 together without overheating the heating element. The thermosetting ceramic sealant 86 also forms a seal against melt leakage between the inner core portion 12 and the outer collar portion 28. Finally, the elastic band 88 is removed prior to installation of the nozzle 10 in a suitable mold.

In use, electrical power is applied to the heating element 96 in the melt distribution manifold 40 and to the heating elements 48 in the nozzle 10 to heat them to a predetermined operating temperature. Pressurized melt is applied from a molding machine (not shown) to the melt passage 96 in the melt distribution manifold 40 according to a predetermined injection cycle. The melt flows through the melt bore 18 in the nozzle 10 and through the two-piece nozzle seal 20 to a gate (not shown) in the mold. After the cavities are filled and a suitable packing and cooling period has expired, the injection pressure is released and the melt conveying system is decompressed to avoid stringing through the open gates. The mold is then opened to eject the molded products. After ejection, the mold is closed and the cycle is repeated continuously with a cycle time dependent upon the size of the cavities and the type of material being molded.

While the description of the injection molding nozzle 10 has been given with respect to a preferred embodiment, it will be evident that various other modifications are possible without departing from the scope of the invention as understood by those skilled in the art and as defined in the following claims.

The embodiments of the invention in which an exclusive property or privilege is claimed is defined as follows:

1. In an integral heated injection molding nozzle having an elongated inner core portion with a rear end, a front end, a melt bore extending therethrough from the rear end, a cylindrical outer surface, and a head at the rear end which extends outwardly past the outer surface, an outer collar portion encircling the inner core portion adjacent the rear end, the outer collar portion having a shoulder against which the head of the inner core portion abuts, and an electrical heating element with a lead portion extending outwardly through the outer collar portion and a helical portion with an outer surface wound in a spiral groove in the cylindrical outer surface of the inner core portion, the groove having an inner surface with a semicircular base, the improvement comprising the combination of;

(a) the helical portion of the heating element being sufficiently deformed by being press fitted into the groove to ensure substantially continuous contact between the inner surface of the groove and the outer surface of the helical portion of the heating element, and (b) the outer collar portion being secured in place around the inner core portion by thermosetting ceramic sealant applied between the inner core portion and the surrounding outer collar portion.

2. An injection molding nozzle as claimed in claim 1 wherein the helical portion of the heating element has a circular cross-section before being deformed by press fitting into the groove.

3. An injection molding nozzle as claimed in claim 2 wherein the lead portion of the electrical heating element extends outwardly through a terminal connector, the terminal plug having an inner end received in an opening in the outer collar portion, and the thermosetting ceramic sealant secures the terminal connector in place and seals the opening in the outer collar portion to prevent melt leakage therethrough.

4. An injection molding nozzle as claimed in claim 3 wherein the outer collar portion has a cylindrical skirt extending forwardly with a space between the skirt and the outer surface of the inner core portion, and the thermosetting ceramic sealant at least partially fills the space between the skirt and the outer surface to prevent melt leakage between the inner core portion and the surrounding outer collar portion.

5. An injection molding nozzle as claimed in claim 4 wherein the inner core portion and the outer collar portions are made of materials having different thermal conductivities.

* * * * *